C. H. VAN NOSTRAND.
GASKET OR PACKING.
APPLICATION FILED JAN. 5, 1909.
916,805.
Patented Mar. 30, 1909.
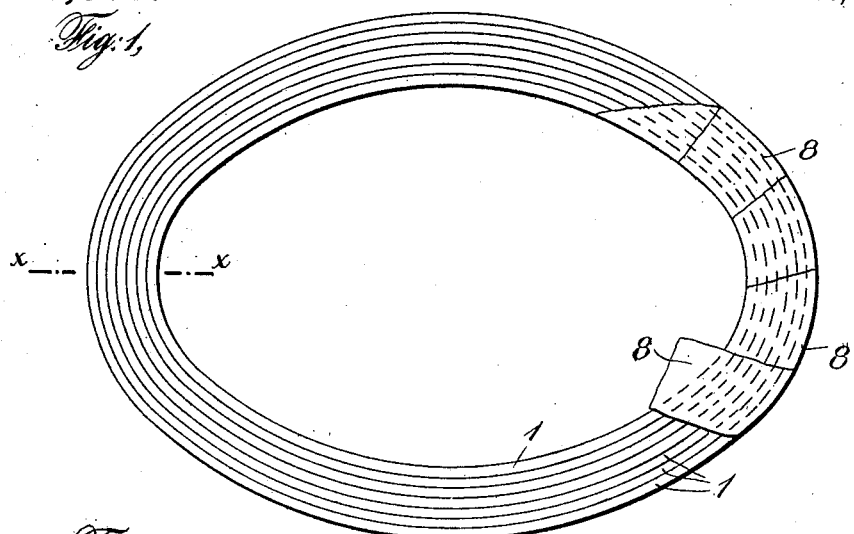
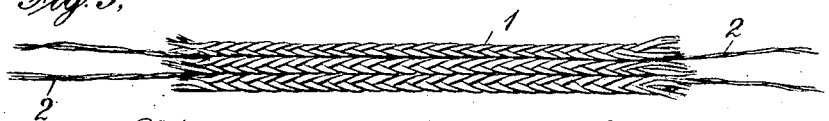
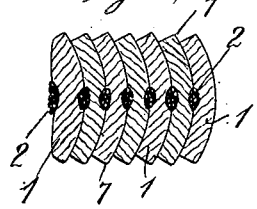
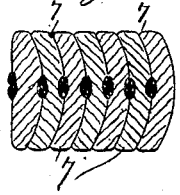
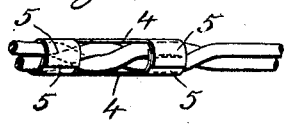
WITNESSES
INVENTOR
Charles H. Van Nostrand
BY
Phillips Abbott
ATTORNEYS

UNITED STATES PATENT OFFICE.

CHARLES H. VAN NOSTRAND, OF ORANGE, NEW JERSEY.

GASKET OR PACKING.

No. 916,805.

Specification of Letters Patent.  Patented March 30, 1909.

Application filed January 5, 1909.  Serial No. 470,872.

*To all whom it may concern:*

Be it known that I, CHARLES H. VAN NOSTRAND, a citizen of the United States, and a resident of the city of Orange, county of Essex, State of New Jersey, have invented a new and useful Improvement in Gaskets and Packings, of which the following is a specification, reference being had to the accompanying drawings, in which—

Figure 1 illustrates a plan view of a gasket embodying my invention; Fig. 2 illustrates an edgewise view of that which is shown in Fig. 1; Fig. 3 illustrates a detail plan view showing three parts of the fibrous material composing the gasket or packing and two strands of the metal or other binder, the ends of all of the parts being broken off; Fig. 4 illustrates a vertical sectional view of a gasket or packing showing the preferred relation of the parts to each other at one stage in the manufacture; Fig. 5 illustrates a view the same as Fig. 4, the top and bottom surfaces of the packing having been leveled and brought down to position by pressure; Fig. 6 illustrates a clip for confining the end of the binder which in this instance is shown as a solid strand or wire.

In the manufacture of gaskets and packings of the class here under consideration, difficulty has been experienced in giving sufficient strength to the structure to withstand the "blowing out" strains to which it is subjected in use, and this difficulty is more pronouncedly encountered when the gasket or packing is made of asbestos or asbestos combined with other fibrous material, owing to the fact that asbestos has but little cohesion, hence little strength when laid up in tape-like or similar form.

Various expedients have been resorted to to increase the strength of gaskets and packings, especially when made entirely or partly of asbestos and they have been attended with greater or less success, but none of them, so far as I am aware, accomplish the object so effectively, inexpensively and permanently as I secure by the invention about to be described.

Referring to the drawings, 1 represents a tape-like layer of the fibrous material of which the gasket or packing is composed. In the case illustrated it is pure asbestos. It may be made of any preferred fibrous material, or of two or more different kinds of fibrous material. I prefer to give the tape or strand a concavo-convex form, as illustrated in Fig. 4, by the employment of suitable apparatus, and I prefer also to make the packing upon a suitable form to secure accuracy in its shape and size. This apparatus I do not illustrate, however, because it forms no essential part of this invention, and their special construction is immaterial, as is also the special form of gasket or packing made by them, the shapes shown in the drawings being merely examples of forms in which the structure may be made. I prefer that the fibrous material composing each gasket or packing shall be continuous, or all in one piece, so that there may be no joints therein.

2 represents what I term the binder. It, the same as the fibrous material, is preferably in a single continuous length, so that it shall be without joint in any single gasket or packing, and I prefer to make it of some non-corrosive metal, such as brass or copper wire, and instead of having the wire in the form of a single strand, as shown in Fig. 6, I prefer to make it of a series of fine wires or strands loosely intertwined, so as to present a rough or uneven surface, exteriorly, as shown in the other figures which aids in producing friction between the parts; and I prefer also to so dispose the several strands that the binder shall have an oblong shape in cross-section, as shown in Figs. 4 and 5, so that the same may be more readily embedded in the adjoining surfaces of contiguous layers of the fibrous material. The material of which the binder is formed should be of sufficient strength to stand considerable strain because in laying up the gasket or packing, the fibrous material and the binder are contemporaneously coiled or laid in position, the material being subjected to a certain strain and the binder a greater strain, so that the surfaces of the tape being coated with suitable cementitious material, not illustrated, may be attached to each other and the binder will be drawn forcibly down into the structure of the tape and partially or wholly embedded therein, as shown, so as to produce a firm, rigid and semi-solid structure. The binder may be made of fibrous material, if preferred, and likewise it may be of corrosive metal, as for instance steel wire, because in some uses the objections resulting from corrosion or rust would not arise and so far as fibrous material for the binder is concerned, if the gaskets or packings be large a sufficiently strong binder can be made from fibrous material.

After the required number of convolutions have been coiled together to make the size gasket or packing desired, then the tape is cut off; or it may have been cut into the proper length before the coiling operation commenced and the severed end is preferably reduced in thickness so as to leave a smooth exterior surface on the packing, and about the outermost coil I prefer to make two or more laps of the binder as illustrated at 3 in Fig. 2, so as to firmly secure and bind the gasket or packing together by encircling it with a hooplike band composed of the plurality of coils of the binder. In many instances, however, a single strand of the binder, the same as that which is deposited between the several convolutions of the fibrous material will suffice and in order to suitably fasten the exterior end of the binder, I prefer to wrap its terminal end about the last convolution of the binder and after it has been drawn forcibly into position to hold it there by a clip, shown at 4 in Fig. 6, the ends of the clip being provided with parts 5, 5, which may be bent over upon the end of the binder and hammered down, thus holding the same.

It will be noted that the edges of the several convolutions of the fibrous material, if they be made concavo-convex, as preferred, will project at the sides of the packing or gasket, as shown at 7 in Fig. 4. In order to make these surfaces smoother and more continuous and hence better adapted to serve the purpose, I prefer to coat the surfaces after the packing or gasket has been made with a suitable cementitious material, as, for example, rubber cement, and then subject them to a compressing action, so that the upwardly projecting edges 7, 7, will be flattened down and rendered relatively smooth, as shown in Fig. 5. I also sometimes, in order to give still greater smoothness and tightness to the packing or gasket, wrap about the same an exterior covering 8, see Fig. 1, of asbestos or similar cloth, which may be beneficially attached to the packing or gasket by suitable cementitious material.

The simplicity, inexpensiveness and durability of packings or gaskets made under my invention are apparent and it will be particularly noticed that it will be practically impossible to burst or blow out a gasket or packing so made, because each coil of the fibrous material has its own reinforcing binder in addition to the cementitious material to hold it in place and this binding material is not in the form of threads or strands of fibrous material or metal interwoven in the body of the fibrous material which could be put under no greater strain than the fibrous material or tape will itself withstand, on the contrary, it has a separate binder or reinforce having inherently much greater strength than the fibrous material and which is wrapped about the outside of each successive layer or coil thereof and is forcibly drawn down upon it so as to bind it exteriorly against the thrust of the pressures from the interior, after the manner of a barrel hoop, which is perhaps the best known method in which to dispose such reinforcing material, and furthermore upon the exterior of the packing, considered as a whole, the strong binder is made additionally effective by multiplying its coils or convolutions and straining upon the same to such degree that it is embedded within the outer coil of the fibrous material, thus surrounding the whole with a band or hoop capable of resisting great bursting strains. By my construction also the beneficial results arising from friction between the parts are availed of in a very efficient manner.

It will be obvious to those who are familiar with this art that modifications may be made in the details of construction above described and illustrated without departing from the essentials of the invention and also, as heretofore stated that the invention is applicable to packings and gaskets of a great variety of forms or constructions adapted to a great variety of uses. Also although in this specification I have referred to the fibrous material as being in tape like or strand form, I do not mean to be understood as saying that that is the only form in which the material may be used, because I contemplate using it at any stage of its manufacture. I therefore do not limit myself to the details as described and illustrated nor to the form of the invention shown.

I claim:

1. A structure of the class stated embodying a fibrous member and a binding member coiled together into the desired form, the binding member being on the outside.

2. A structure of the class stated embodying a fibrous member and a binding member coiled together into the desired form, the binding member being on the outside and cementitious material between the contacting surfaces of the several coils of the fibrous member.

3. A structure of the class stated embodying a fibrous member and a binding member each continuous throughout its length, coiled together into the desired form, the binding member being on the outside.

4. A structure of the class stated embodying a fibrous member and a binding member each continuous throughout its length, coiled together into the desired form, the binding member being on the outside and cementitious material between the contacting surfaces of the several coils of the fibrous material.

5. A structure of the class stated embodying a fibrous member and a binding member coiled together into the desired form, the binding member being on the outside, the upper and lower edges of the fibrous material being compressed into a smooth uniform surface.

6. A structure of the class stated embodying a fibrous member and a binding member coiled together into the desired form, the binding member being on the outside and a wrapper of fibrous material about the structure.

7. A structure of the class stated embodying a fibrous member and a binding member coiled together into the desired form, a coil of the binding member being on the outside of each coil of the fibrous member and a plurality of coils of the binding member surrounding the outermost coil of the fibrous member.

8. A structure of the class stated embodying a fibrous member and a binding member coiled together into the desired form, each member being continuous throughout its length, cementitious material between the contacting surfaces of each coil of the fibrous member, each coil of the binding member being on the outside of each coil of the fibrous member and a plurality of coils of the binding member surrounding the outermost coil of the fibrous member.

9. A structure of the class stated embodying a fibrous member and a binding member coiled together into the desired form, each member being continuous throughout its length, cementitious material between the contacting surfaces of each coil of the fibrous member, each coil of the binding member being on the outside of each coil of the fibrous member and a plurality of coils of the binding member surrounding the outermost coil of the fibrous member and a wrapper of fibrous material about the structure.

In testimony whereof I have signed my name to this specification in the presence of two subscribing witnesses.

CHARLES H. VAN NOSTRAND.

Witnesses:
F. M. DOUSBACH,
VINCENT SCULLY.